United States Patent [19]

Kelly

[11] Patent Number: 4,885,099
[45] Date of Patent: Dec. 5, 1989

[54] CLOSED SYSTEM SOLVENT STRIPPING AND RECLAIMING APPARATUS

[75] Inventor: George H. Kelly, Anchorage, Ak.

[73] Assignee: J.A.C. Corporation, Anchorage, Ak.

[21] Appl. No.: 925,336

[22] Filed: Oct. 31, 1986

[51] Int. Cl.$^4$ .......................... B01D 41/02; B08B 7/04
[52] U.S. Cl. ..................................... 210/771; 210/774;
 134/12; 203/4; 203/39; 203/95; 203/97;
 203/DIG. 16; 202/170; 202/175; 202/200;
 202/233
[58] Field of Search ........................ 134/12; 68/18 C;
 202/170, 175, 182, 200, 233, 234, 235; 203/4,
 95, 97, 49, 39, DIG. 16; 55/179; 210/774, 771

[56] References Cited

U.S. PATENT DOCUMENTS

| 3,089,250 | 5/1963 | Victor | 203/95 |
| 3,332,854 | 7/1967 | Duckstein | 203/95 |
| 3,362,888 | 1/1968 | Ricigliano | 134/12 |
| 4,444,625 | 4/1984 | Smith | 203/95 |

Primary Examiner—Richard V. Fisher
Assistant Examiner—Cynthia L. Nessler
Attorney, Agent, or Firm—Christensen, O'Connor, Johnson & Kindness

[57] ABSTRACT

A closed circuit solvent stripping and reclaiming apparatus for recovering solvent from filters used in dry cleaning machines comprising a steam cabinet (2), and condenser (3), a water solvent separator (4), a recirculating tank (5), a blower (6) and a carbon bed adsorber (7). Dry cleaning filters are disassembled and their constituents separated and placed in foraminous trays (9) inside the steam cabinet (2). The filter material is agitated with a shaker and alternately subjected to dry heat, vaporized recycled solvent saturated water, and live steam. Steam and solvent vapors derived from the filters are conducted to a condenser (3) for liquification followed by separation in the water solvent separator (4). Solvent is thereby reclaimed and solvent saturated water is collected and stored in the recycling tank for reintroduction into the steam cabinet for subsequent stripping cycle. Upon completion fo the live steam stripping step, air is conducted into the steam cabinet, heated and passed through the filter material. Residual solvent vapors are then conducted via a blower (6) to a carbon bed adsorber so that only solvent-free air is vented to the atmosphere. The carbon bed adsorber (7) is periodically desorbed with live steam and the vapors are returned to the condenser (3) for liquification and separation in the solvent water separator (4). Excess solvent saturated water may be drained from the recycling tank or reintroduced into the steam cabinet where it is vaporized. These vapors are then conducted via the blower (6) to the adsorber (7) for adsorption.

19 Claims, 1 Drawing Sheet

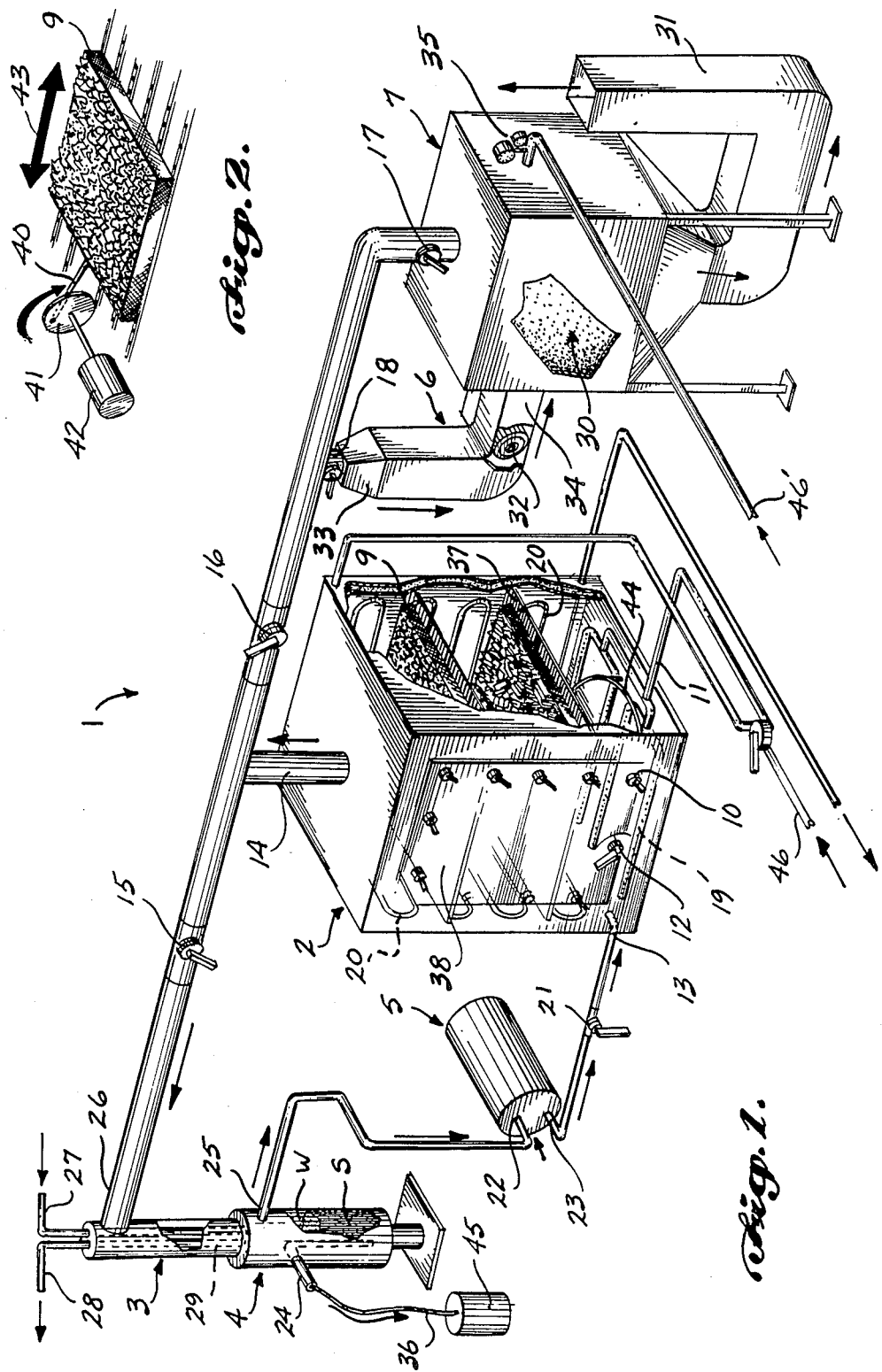

CLOSED SYSTEM SOLVENT STRIPPING AND RECLAIMING APPARATUS

TECHNICAL FIELD

The present invention relates to equipment and its use for stripping and reclaiming solvent from solvent laden material without release of solvent into the environment. Specifically, this invention relates to solvent stripping and reclaiming of dry cleaning filter material and other solvent contaminated byproducts of the dry cleaning process, to meet EPA solid disposal requirements and local water discharge regulations.

BACKGROUND OF THE INVENTION

Solvent used in dry cleaning machines is commonly filtered to remove various contaminants. The filter cartridges employed in these machines ultimately must be replaced. Spent filter cartridges and other material such as lint containing hazardous solvents such as perchloroethylene (Perc), trichloroethane or trichloroethylene cannot normally be disposed of at ordinary solid waste disposal sites. These filter cartridges and other solvent contaminated materials must either be shipped, often at considerable expense, to a hazardous waste disposal site, or stripped of solvent to a "safe" level set by the EPA before they can be disposed of at a normal waste disposal site. This safe disposal level may be changed periodically as the EPA evaluates the environmental harm.

Steam is an easily produced and effective vehicle for stripping and reclaiming solvent from various materials, particularly when the solvent is immiscible with water. Perc is such a solvent, and others have rported the use of steam in various schemes to extract solvent from dry cleaning filters. The prior art discloses the adaptation of dry cleaning filter housings to receive steam thereby stripping filters in situ. For example, Tomes, U.S. Pat. No. 4,581,133, discloses a solvent reclaiming apparatus for stripping filter cartridges in situ, followed by distillation of the solvent (Perc), condensation and separation in a water solvent separator so that the solvent can be reclaimed. Filters treated as described by Tomes are reported to be contaminated with low enough levels of solvent to satisfy EPA requirements for disposal at an ordinary waste disposal site. Similarly, Fine, U.S. Pat. No. 4,513,590 discloses an apparatus which employs steam to strip filter cartridges in situ and to reclaim the solvent by condensation and separation. Fine simply passes enough steam through the cartridges until virtually all solvent has been removed. The Fine patent also discloses the use of an activated carbon bed to absorb solvent vapors during the filter stripping process.

Machines of the type described by Fine and Tomes must be added or adapted to fit each existing dry cleaning machine in order to strip filters of their solvent to meet EPA requirements. These machines are designed to strip filter cartridges in situ and therefore are unsuited for accepting exogenous filters, or other solvent contaminated materials such as lint. It can be seen that the prior art discloses machines that would add a substantial expense to each dry cleaning establishment and create unnecessary duplication of equipment.

Moreover, stripping filters in situ in their intact state requires substantial quantities of live steam which in turn produces substantial quantities of solvent contaminated water. Machines described in the prior art do not disclose how solvent contaminated water generated during the stripping process is to be handled. Without addressing this problem, the machines disclosed by Fines and Tomes would be rendered unsuitable since many localities have zero discharge requirements for perchloroethylene.

A need has therefore arisen for an environmentally sound solvent stripping and reclaiming apparatus which does not require that filters be stripped in situ. The apparatus should be capable of accepting filters from a variety of different dry cleaning machines as well as other material and should be flexible enough to meet changing EPA requirements. The apparatus should be inexpensive to operate, and not produce excessive quantities of solvent contaminated water. Finally, whatever solvent contaminated water is produced should be capable of meeting local discharge requirements.

SUMMARY OF THE INVENTION

The present invention is a closed system solvent stripping and reclaiming apparatus for strippingperchloroethylene from dry cleaning machine filters and byproducts that overcome many of the problems not addressed by the prior art. This invention applies dry heat, recycled water vapor, live steam and hot moving air to dismantled filter cartridge components contained in a steam cabinet thereby stripping them of sufficient solvent to render them safe for ordinary disposal. The steam and solvent vapors produced are condensed and separated in a solvent water separator and the solvent is reclaimed. Solvent contaminated water derived from the water solvent separator is collected, stored and recycled back into the steam cabinet during a succeeding filter stripping cycle. This reintroduction of solvent saturated water into the steam cabinet substantially improves the efficiency of the solvent extraction and greatly diminishes the quantity of live steam required to strip filter material.

After the live steam extraction step has concluded, hot air is drawn through the filter material to remove remaining steam and solvent vapors. These vapors are adsorbed by an activated carbon bed and moist air is vented to the atmosphere. Periodically the carbon bed is desorbed by live steam. Desorbed solvent is reclaimed from the water solvent separator and the steam so produced is collected and stored in the recycling tank.

Excess solvent contaminated water that accumulates in the recycling tank may be drained periodically, if local discharge standards permits, or reintroduced into the steam cabinet, evaporated and the solvent vapors adsorbed by the activated carbon bed.

BRIEF DESCRIPTION OF DRAWINGS

A better understanding of the invention and its advantages can be had by reference to the accompanying drawings.

FIG. 1 shows the solvent stripping and reclaiming apparatus with portions broken away to show internal construction; and FIG. 2 provides a view from inside the steam cabinet displaying the agitating mechanism for filter components.

DETAILED DESCRIPTION OF THE PREFERRED EMBODIMENT

Referring now to FIG. 1, a solvent stripping and reclaiming apparatus 1 constructed in accordance with the invention includes a steam cabinet 2, a condenser 3, a water-solvent separator 4, a solvent-laden water recirculation tank 5, a blower 6, and a carbon bed adsorber 7. These components are coupled by appropriate vapor and liquid conduits. Vapor conduit 14 exits from the top of cabinet 2 and joins conduit 26 at a "T" coupling. One side of conduit 26 routes vapor from conduit 14 through a valve 15 to the condenser 3. The other side of conduit 26 routes vapor through valves 16 and 17 to the top of adsorber 7. Water from separator 4 is routed via conduit 25 to recirculating tank 5, while water from tank 5 is routed via conduit 23 through valve 21 to the bottom of cabinet 2. The blower 6 is situated in conduit 34, one end of which is coupled to the absorber 7 and the other end of which is coupled to conduit 26 between valves 16 and 17.

Air can be admitted to the cabinet 2 through air inlet valve 12 mounted near the bottom of cabinet 2. The cabinet also carries steam coils 20 for heating the interior. Provision is also made for admitting live steam to a sparger 19 located in the bottom of the cabinet 2 via steam inlet 11 and line 46. Steam is supplied through a three-way selector valve to either coils 20, line 11 or both.

The stripping and reclaiming apparatus 1 is particularly adapted for use with dry cleaning solvent contaminated material. Intact dry cleaning filters may be stripped of their dry cleaning solvent in steam cabinet 2. However, it is preferred that the dry cleaning filters be disassembled and the nonsolvent adsorbing portion be discarded leaving only the solvent adsorbing material to be stripped. It is most preferred that the solvent absorbing filter material be segregated into two groups comprising the fibrous solvent adsorbing filter material such as paper, and the particulate solvent saturated material such as activated carbon and clay particles. Substantial quantities of solvent contaminated material collected from lint filters, lint traps and button traps each day must also be decontaminated. These materials may be treated separately or combined with the organic solvent saturated filter material.

The segregated solvent contaminated materials are placed in foraminous trays 9, which are in turn placed on racks 37 inside the steam cabinet 2. The steam cabinet 2 is typically of a size suitable for receiving solvent laden filter material from six filters of conventional size and shape. For a cabinet of this size it is preferred that solvent laden filter material from fewer filters, for example three filters at a time, be placed in the solvent cabinet 2 for stripping. Three filters typically contain about 4.5 gallons of solvent that must be stripped away. This procedure produces the shortest stripping time and uses the smallest quantity of live steam.

After placing solvent laden filter material inside steam cabinet 2, the steam cabinet door 38 is closed and sealed with sealing bolts 10. Thereafter, air inlet valve 12, steam cabinet water inlet valve 21, and first carbon bed adsorber valve 16 are closed and condenser inlet valve 15 is opened. Cold water is supplied to the condenser water inlet 27 to provide a cold surface for condensation of solvent vapors and steam. Dry heat is then applied to the steam cabinet 2 by admitting steam to the steam coils 20 deployed along the inside walls of the steam cabinet.

The temperature inside the steam cabinet is increased to approximately 212° F. vaporizing much of the initial solvent, which is conducted out through steam and solvent vapor outlet conduit 14 to condenser 2 wherein the solvent vapors are condensed back to the liquid state. The liquid solvent and water are transferred to the separator 4. The solvent, typically Perc, is immiscible with water and has a specific gravity greater than one. Therefore, the solvent and water are separated by gravity in the separator 4. Water derived from the separator contains small amounts of solvent which should not be discharged into a sewage system or into the environment. Instead, this water can be recycled to increase the overall efficiency of the system as described in more detail below. Solvent is removed from the bottom of the separator via outlet 24 and transferred through transparent discharge tube 36 to a storage container 45. Solvent laden water is transferred via conduit 25 from the top of the separator.

The application of dry heat to the solvent laden filter material is typically continued for from 30 to 45 minutes. However, the end point is best detected by observing the quantity of solvent being reclaimed in the water solvent separator 4. The dry heating step concludes with the observation of no more solvent passing through the transparent discharge tube 36.

At this point, water is admitted to the steam cabinet through steam cabinet water inlet 13. From one to ten gallons of water may be admitted to the steam cabinet through inlet 13, however, it is preferred that approximately five gallons of water be admitted, when three filters are being stripped. It is further preferred that the water admitted to steam cabinet 2 be solvent saturated water that has been stored in recirculating tank 5. Solvent saturated water stored in recirculating tank 5 is produced by a previous stripping cycle, and is supplied to steam cabinet 2 by opening steam cabinet water inlet valve 21 thereby allowing solvent saturated water to flow from tank 5 through outlet 23 and inlet 13 into steam cabinet 2. Use of the solvent laden water decreases the overall use of water and steam and prevents continuing contamination of the environment with hazardous solvent. Water admitted to the steam cabinet in this manner is heated by the steam coils 20 deployed along the inside walls of steam cabinet 2. The water is vaporized which, in turn, extracts additional solvent from the solvent laden filter material. Steam and solvent vapors produced in this step are conducted through the steam and solvent vapor outlet 14 through conduit 26 to condenser 2. Water and dry heat are supplied to the steam cabinet until no more reclaimed solvent is observed through transparent solvent discharge tube 36.

At this point, steam cabinet water inlet valve 21 is closed and live steam is admitted to the steam cabinet through live steam inlet 11 which passes through small holes in the live steam spargers 19. Steam introduced in this way then passes through the formaminous trays 9 containing solvent laden filter material further extracting solvent from the filter material. It is most preferred that the foraminous trays be agitated by a shaker, as shown in FIG. 2. In its simplest form, the shaker comprises an arm 40 coupled to a tray 9. The arm is coupled at its opposite end to an off-center location on a wheel 41, which in turn is rotated by motor 42. Rotation of the wheel 41 will thus produce oscillations in the tray 9 in the direction shown by arrow 43. The shaker improves the efficiency of solvent extraction by agitating the solvent laden inorganic filter material thereby exposing new surfaces for steam extraction. Steam and solvent vapor produced in this manner are conducted through outlet 14 to condenser 3 as previously described. Live steam is applied to the solvent laden filter material until no more reclaimed solvent is observed flowing through transparent solvent discharge tube 36.

After no more solvent can be reclaimed by the live steam stripping step, the live steam supply to steam cabinet 2 is shut off. Thereafter, condenser inlet valve 15 and second carbon bed adsorber valve 17 are closed, while air inlet valve 12, first carbon bed adsorber valve 16 and blower valve 18 are open and squirrel cage blower 32 is turned on. Air is drawn in through valve 12 and steam and solvent vapors pass from steam cabinet 2 through outlet 14, and are conducted through conduit to blower inlet 33 and out blower exhaust 34 into carbon bed adsorber 7. Any remaining solvent vapors are adsorbed to the activated carbon adsorbent 30 and solvent-free air passes out through the carbon bed adsorber exhaust 31. Air at ambient temperature may be drawn through the steam cabinet and passed through carbon bed absorber 7 as described above. However, it is preferred that the air be heated by dry steam heating coils 20 thereby diminishing the amount of time needed to remove residual solvent from the filter material. It is preferred that heat be applied to steam cabinet 2 through heating coils 20 for from 15 to 20 minutes, at which time the heat is turned off. The circulating air then cools the contents of steam cabinet 2 to ambient temperature. Filter material treated in this way is found to contain less than 0.0116% by weight solvent based on the total weight of the filters.

In an alternative embodiment of this invention, additional heat may be applied to the filter material through electric heating coil 44. In this embodiment, after drawing air through inlet valve 12, heating it with heating coil 20 for 20 minutes and drawing the vapors produced through the carbon bed adsorber 7, heat is applied through heating coil 44 to elevate the temperature within steam cabinet 2 to 400° F. Vapors derived from the filter material so treated are conducted through outlet 14 and forced into carbon bed adsorber 7 by blower 6.

Periodically, the carbon bed 30 becomes saturated with solvent, and must be desorbed to revitalize it for future use. Desorption is accomplished by opening valves 15, 16 and 17, closing valve 18 and admitting steam into the adsorber through line 46'. It is preferred that a steam pressure of 10 psi as monitored by gauge 35 be maintained to hasten the desorption process. Steam and solvent vapors derived from the carbon bed adsorber 7 are conducted to condenser 3 via conduit 26. These vapors are condensed by condenser 3 and separated in the water solvent separator 4 thereby reclaiming additional solvent.

Water saturated with solvent from this condensation passes from the water solvent separator 4 through outlet 25 and into recirculating tank 5. Periodically, excess solvent saturated water in recirculating tank 5 may be drained if local water discharge standards permit. Alternatively, solvent saturated water may be discharged from tank 5 through outlet 23, valve 21, and inlet 13 into steam cabinet 2. With valves 15 and 17 closed, valves 16, 18 and 12 open, and with fan 32 on, solvent saturated water may be vaporized by dry steam heating element 20. With this configuration of the valves, vaporized steam and solvent will pass through carbon bed adsorber 7 adsorbing any residual solvent and discharging air and water vapor through exhaust 31.

The present invention has been described in relation to a preferred embodiment thereof and several alternatives thereof. One of ordinary skill, after reading the foregoing specification, will be able to effect various changes, substitutions of equivalents and other alterations without departing from the broad concepts disclosed herein. It is therefore intended that the scope of Letters Patent granted hereon be limited only by definition contained in the appended claims and equivalents thereof.

The embodiments of the invention in which an exclusive property or privilege is claimed are defined as follows:

1. A solvent stripping and reclaiming apparatus comprising:
   (a) vessel means for receiving solvent laden material, said vessel means having a first valve controlled inlet for admitting live steam to said vessel means, a second valve controlled inlet for admitting gas to said vessel means, a third inlet for admitting water to said vessel means, means for heating said vessel means, a water supply means for supplying water to said third inlet, and a steam and solvent vapor outlet from said vessel means;
   (b) condenser means for cooling steam and solvent vapors, to condense them into the liquid phase, said condenser means having a steam and solvent vapor inlet connected by valve controlled conduit means to said outlet from said vessel means, and a liquid outlet;
   (c) separator means for receiving liquid from said condenser means and separating said solvent and water based on their immiscibility, said separator means having an output for solvent thereby reclaiming said solvent and an outlet for solvent saturated water;
   (d) adsorber means for selectively adsorbing solvent from a solvent vapor and an air stream, said adsorber means directly connected by conduit means to said outlet from said vessel means, said adsorber means including a housing containing a bed of activated carbon adsorbent, said housing having a solvent vapor and air inlet and an exhaust outlet that discharges solvent-free air into the atmosphere; and
   (e) blower means for forcing air and solvent vapor from said vessel means into said adsorber means for the purpose of adsorbing said solvent vapors therein, said blower means having an intake connected by a valve controlled conduit means to said steam and solvent vapor outlet of said vessel means for receiving air and solvent vapor therefrom, said blower means having an exhaust outlet connected by conduit means to said solvent vapor and air inlet of said carbon bed adsorber.

2. The apparatus of claim 1, wherein said adsorber means further comprises a live steam inlet for supplying live steam to said activated carbon adsorbent to desorb said adsorbent, and a steam and solvent vapor outlet for conducting steam and solvent vapors out of said adsorbent bed connected by a valve controlled conduit means to the steam and solvent vapor inlet of said condenser means thereby conducting said steam and solvent vapor to said condenser means.

3. The apparatus as recited in claim 1, wherein said water supply means comprises an inlet connected to a solvent saturated water outlet of said separator means, said water supply means having an outlet connected by valve controlled conduit means to the third inlet of said vessel means, said supply means receiving solvent saturated water from said separator means and storing said water prior to reintroduction into said vessel means, thereby decreasing the amount of live steam necessary to strip the solvent laden material and preventing the release of any solvent saturated water into the environment.

4. The apparatus as recited in claim 2, wherein said means for heating said vessel means comprises a steam coil disposed within said vessel means, and means for connecting said coil to said steam supply.

5. The apparatus as recited in claim 2, further comprising a second heating means disposed within said vessel capable of increasing and maintaining the temperature within said vessel means to at least 400° F. to assist in removing substantially all solvent from the solvent laden material.

6. The apparatus as recited in claim 2, wherein said valve controlled conduit means for connecting said steam and vapor outlet of said vessel means with the inlet of said condenser means, said valve controlled conduit means for connecting said blower means intake to the steam and vapor outlet of said vessel means, and the valve controlled conduit means connecting the steam and solvent vapor outlet of said adsorber means to the steam and solvent vapor inlet of said condenser means comprises a single common conduit means.

7. The apparatus as recited in claim 2, which further comprises:
   an agitation means disposed within said vessel means for agitating solvent laden material therein.

8. A solvent stripping process for removing and reclaiming solvent from dry cleaning laden filters comprising the steps of:
   (a) heating solvent laden filter material in an enclosure thereby vaporizing said solvent; then
   (b) injecting water into the heated enclosure and vaporizing said water to enhance the removal of solvent from said filter material;
   (c) thereafter forcing live steam into said enclosure to further enhance removal of solvent from said filter material;
   (d) condensing solvent vapors and steam produced by the above steps into a liquid phase;
   (e) separating the liquid phase into a solvent and a solvent contaminated water, thereby reclaiming said solvent; and
   (f) passing dry gas through said filter material thereby stripping said filter material of remaining solvent.

9. The solvent stripping process of claim 8, further comprising the steps prior to heating the solvent filter material of:
   (a) separating the filter material into solvent adsorbing filter material and nonadsorbing filter material; and (b) placing only the solvent adsorbing filter material in the enclosure.

10. The solvent stripping process of claim 9, comprising further the step of:
    prior to heating the solvent laden filter material, separating the solvent adsorbing material into a solvent laden fibrous filter material and a solvent laden particulate filter material.

11. The solvent stripping process of claim 10, further comprising:
    the step of agitating said filter material while forcing live steam into said enclosure to enhance the solvent extraction therefrom.

12. The solvent stripping process of claim 8, further comprising the step after passing dry gas through said filter material of heating said filter material to at least 400° F.

13. The solvent stripping process of claim 8, further comprising the step, after passing dry gas through said filter material, of:
    urging said gas through a carbon bed absorber to remove residual solvent vapor therein, and thereafter discharging solvent free gas from said absorber.

14. The solvent stripping process of claim 13, further comprising the steps of:
    (a) forcing live steam through said carbon bed adsorber to desorb and reactivate said carbon bed adsorber;
    (b) condensing the vapors from said carbon bed adsorber to form a liquid phase; and
    (c) separating the liquid phase into a solvent from the water thereby reclaiming said solvent from said carbon bed adsorber.

15. The solvent stripping process of claim 8, further comprising the steps of:
    collecting and storing solvent contaminated water from said separation step (e).

16. The solvent stripping process of claim 15, wherein the water injected into said heated enclosure comprises said solvent contaminated water.

17. The solvent stripping process of claim 8, wherein the dry cleaning solvent comprises perchloroethylene and the dry gas is air.

18. The solvent stripping process of claim 10, wherein the solvent laden fibrous filter material comprises paper and the solvent laden particulate filter material comprises clay and activated carbon.

19. The solvent stripping process of claim 8, wherein the dry cleaning solvent is trichloroethane or trichloroethylene and the dry gas is air.

* * * * *